United States Patent
Wu

(10) Patent No.: US 11,696,645 B1
(45) Date of Patent: Jul. 11, 2023

(54) REMOVABLE HEADREST FOR GAMING CHAIR AND GAMING CHAIR

(71) Applicant: HONG KONG WUDI INTERNATIONAL TRADING CO., LIMITED, Hong Kong (CN)

(72) Inventor: Peng Wu, Shanghai (CN)

(73) Assignee: HONG KONG WUDI INTERNATIONAL TRADING CO., LIMITED, Hong Kong (CN)

( * ) Notice: Subject to any disclaimer, the term of this patent is extended or adjusted under 35 U.S.C. 154(b) by 0 days.

(21) Appl. No.: 18/097,302

(22) Filed: Jan. 16, 2023

(30) Foreign Application Priority Data

Apr. 21, 2022 (CN) .......................... 202220929718.9

(51) Int. Cl.
*A47C 7/38* (2006.01)
*A47C 7/62* (2006.01)
*A47C 1/036* (2006.01)
*A47C 1/10* (2006.01)
*B60N 2/803* (2018.01)

(52) U.S. Cl.
CPC ................ *A47C 7/38* (2013.01); *A47C 1/036* (2013.01); *A47C 1/10* (2013.01); *A47C 7/383* (2013.01); *A47C 7/386* (2013.01); *B60N 2/803* (2018.02)

(58) Field of Classification Search
CPC ........... A47C 7/38; A47C 7/383; A47C 7/386; A47C 1/10; A47C 1/036; B60N 2/803
See application file for complete search history.

(56) References Cited

U.S. PATENT DOCUMENTS

| 623,414 | A | * | 4/1899 | Mcloud | B60N 2/803 297/396 |
| 3,729,228 | A | * | 4/1973 | Inoue | B60N 2/803 297/396 |
| 4,549,766 | A | * | 10/1985 | Nishino | B60N 2/803 297/391 |
| 6,517,156 | B1 | * | 2/2003 | Lin | A47C 1/036 297/284.4 |

(Continued)

FOREIGN PATENT DOCUMENTS

CN 210300273 U 4/2020

*Primary Examiner* — Syed A Islam
(74) *Attorney, Agent, or Firm* — Bayramoglu Law Offices LLC

(57) ABSTRACT

A removable headrest for a gaming chair includes a headrest arranged on the top of a chairback of the gaming chair. The headrest includes a headrest frame, a headrest bottom support frame, and a headrest padding. The headrest frame and the headrest bottom support frame are tightly connected. The chairback includes a chairback frame, a chairback top support frame, and a chairback covering. The chairback frame, the chairback top support frame, and the headrest are all arranged in the chairback covering. An installation plate is arranged on the headrest bottom support frame, and the installation plate extends to the outside of the headrest padding. The installation plate and the chairback top support frame are respectively provided with installation holes matched with each other, and the installation plate and the chairback top support frame are tightly connected through the installation holes. The headrest frame and the chairback frame are smoothly connected.

18 Claims, 6 Drawing Sheets

(56) References Cited

U.S. PATENT DOCUMENTS

| | | | |
|---|---|---|---|
| 7,185,950 B2* | 3/2007 | Pettersson | B60N 2/888 297/216.12 |
| 9,028,000 B2* | 5/2015 | Millan | B60N 2/24 297/391 |
| 10,336,230 B2* | 7/2019 | Novin | F16C 11/103 |
| 2016/0045030 A1* | 2/2016 | Frankel | A47C 7/383 297/397 |

* cited by examiner

REMOVABLE HEADREST FOR GAMING CHAIR AND GAMING CHAIR

CROSS REFERENCE TO THE RELATED APPLICATIONS

This application is based upon and claims priority to Chinese Patent Application No. 202220929718.9, filed on Apr. 21, 2022, the entire contents of which are incorporated herein by reference.

TECHNICAL FIELD

The present disclosure relates to the technical field of furniture and office supplies, and more particularly, to a removable headrest for a gaming chair and the gaming chair.

BACKGROUND

The gaming chair has powerful functions, which is not limited to a gaming seat but is widely popularized in people's work, study, and production places. The gaming chair has high ergonomic design, which significantly benefits human health.

The Chinese patent with the publication number CN210300273U discloses an adjustable headrest for a gaming chair, including a bottom plate, a track plate, and a headrest. The headrest includes a movable cover plate, a headrest inner lining plate, a headrest sponge, and a leather layer. The bottom plate is configured to be connected to the chairback of the gaming chair, and the track plate and the bottom plate are fixedly connected. The track plate is provided with a plurality of tracks. One side of each track is a slide groove, and the other side of each track is a movable buckle assembly. The movable cover plate is provided with sliders matched with the tracks, and the sliders are provided with buckle grooves matched with movable buckles. In this way, the sliders is allowed to stay in a plurality of positions in the tracks through the coordination of the movable buckles and the buckle grooves, thereby facilitating the adjustment of the height of the headrest. The headrest sponge and the headrest inner lining plate are wrapped by the leather layer and fixedly connected, and the headrest inner lining plate and the movable cover plate are fixedly connected, such that the movable cover plate can cover the leather joint on the rear of the headrest.

The gaming chair in the prior art lacks a backrest that appears to be integrated but is removable. Therefore, it is necessary to provide a reasonable structure.

SUMMARY

In view of the defects in the prior art, an objective of the present disclosure is to provide a removable headrest for a gaming chair and the gaming chair.

A removable headrest for a gaming chair provided in the present disclosure includes a headrest arranged on the top of a chairback of the gaming chair. The headrest includes a headrest frame, a headrest bottom support frame, and a headrest padding. The headrest frame and the headrest bottom support frame are tightly connected and arranged in the headrest padding. The chairback includes a chairback frame, a chairback top support frame, and a chairback covering. The chairback frame and the chairback top support frame are tightly connected. The chairback frame, the chairback top support frame, and the headrest are all arranged in the chairback covering. An installation plate is arranged on the headrest bottom support frame, and the installation plate extends to the outside of the headrest padding. The installation plate and the chairback top support frame are respectively provided with installation holes matched with each other, and the installation plate and the chairback top support frame are tightly connected through the installation holes. The headrest frame and the chairback frame are smoothly connected.

Preferably, the installation plate is arranged on the rear side of the headrest bottom support frame.

Preferably, a side of the headrest bottom support frame and a side of the chairback top support frame are adjacent to each other and tightly abut against each other for cooperation.

Preferably, the size of the headrest bottom support frame and the size of the chairback top support frame are matched with each other, and each of the headrest bottom support frame and the chairback top support frame includes a square tube.

Preferably, the headrest frame includes a hollow round tube. The cross-sectional size of the headrest frame and the cross-sectional size of the headrest bottom support frame are matched with each other.

Preferably, the bottom of the headrest frame and the bottom of the headrest bottom support frame are smoothly connected, and the top of the chairback frame and the top of the chairback top support frame are smoothly connected.

Preferably, the installation plate and the chairback top support frame are tightly connected through a screw, and a rivet nut matched with the screw is arranged in the installation hole of the chairback top support frame.

Preferably, a breathable mesh cloth is wrapped outside the headrest padding.

Preferably, the top of the chairback covering is provided with a zipper.

A gaming chair provided in the present disclosure employs the removable headrest for the gaming chair described above, and further includes the chairback, an armrest, a cushion, and a rotational support frame.

Compared with the prior art, the advantages of the present disclosure are as follows:

1. In the present disclosure, the headrest and the chairback are removably connected and wrapped in the chairback covering, which is conductive to making the appearance integrated and the internal headrest removable, thus expanding the scope of the application.

2. In the present disclosure, the headrest and the chairback are tightly connected through the installation plate, which is conducive to the simplification of the production, thus ensuring the overall strength of the gaming chair.

3. In the present disclosure, the headrest bottom support frame and the chairback top support frame are in shape of a long strip, which is conductive to improving the stability of the installation of the headrest and the chairback, thus ensuring the structural strength of the gaming chair.

BRIEF DESCRIPTION OF THE DRAWINGS

Other features, objectives, and advantages of the present disclosure will become more apparent by reading the detailed description of the non-restrictive embodiments with reference to the drawings below.

Figure 1:
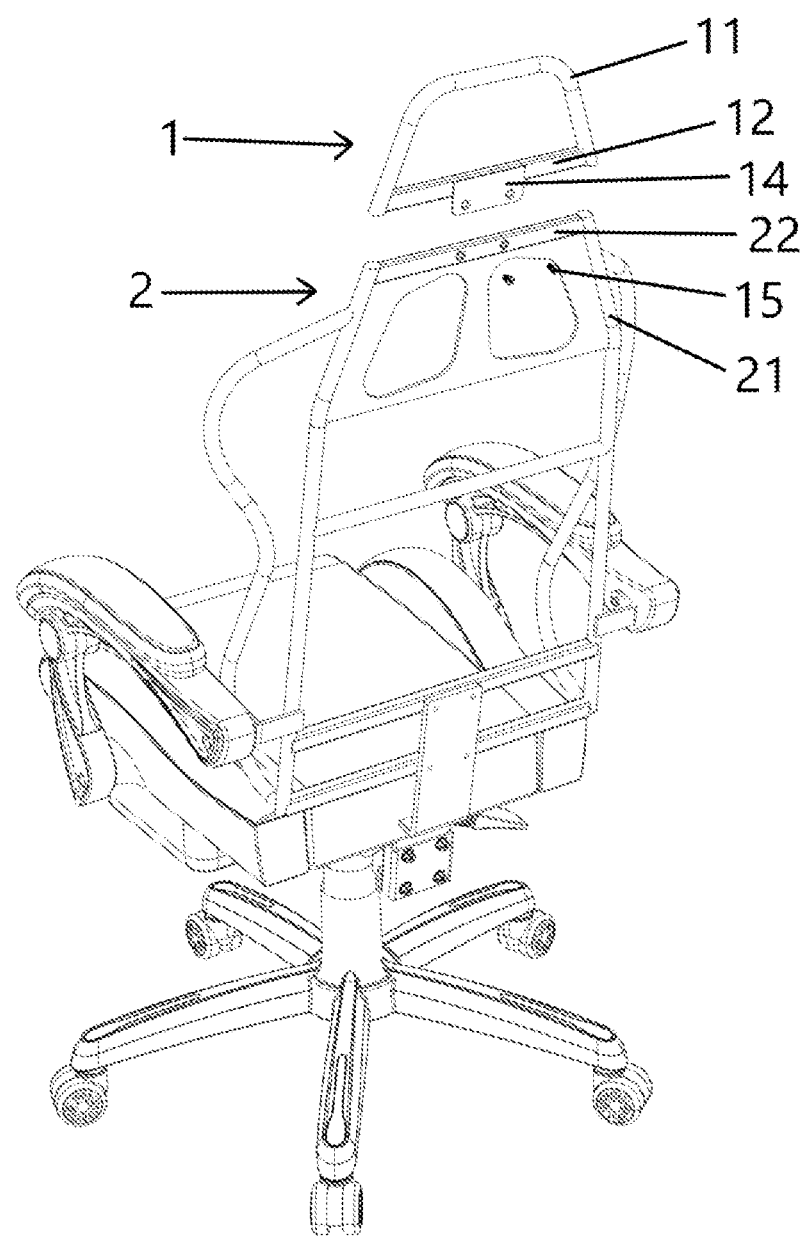
FIG. 1 is a schematic diagram showing the structure of a removable headrest for a gaming chair without a headrest padding according to the present disclosure.

REFERENCE NUMERALS headrest 1 headrest frame 11 headrest bottom support frame 12
headrest padding 13 installation plate 14 screw 15
chairback 2 chairback frame 21 chairback top support frame 22
chairback covering 23 zipper 24

DETAILED DESCRIPTION OF THE EMBODIMENTS

The present disclosure is described in detail below in combination with specific embodiments. The following embodiments will help those skilled in the art to further understand the present disclosure but shall not limit the present disclosure in any form. It should be noted that for those having ordinary skills in the art, a number of changes and improvements can be made without departing from the concept of the present disclosure. All these improvements should be within the scope of protection of the present disclosure.

Embodiment 1

Figure 2:
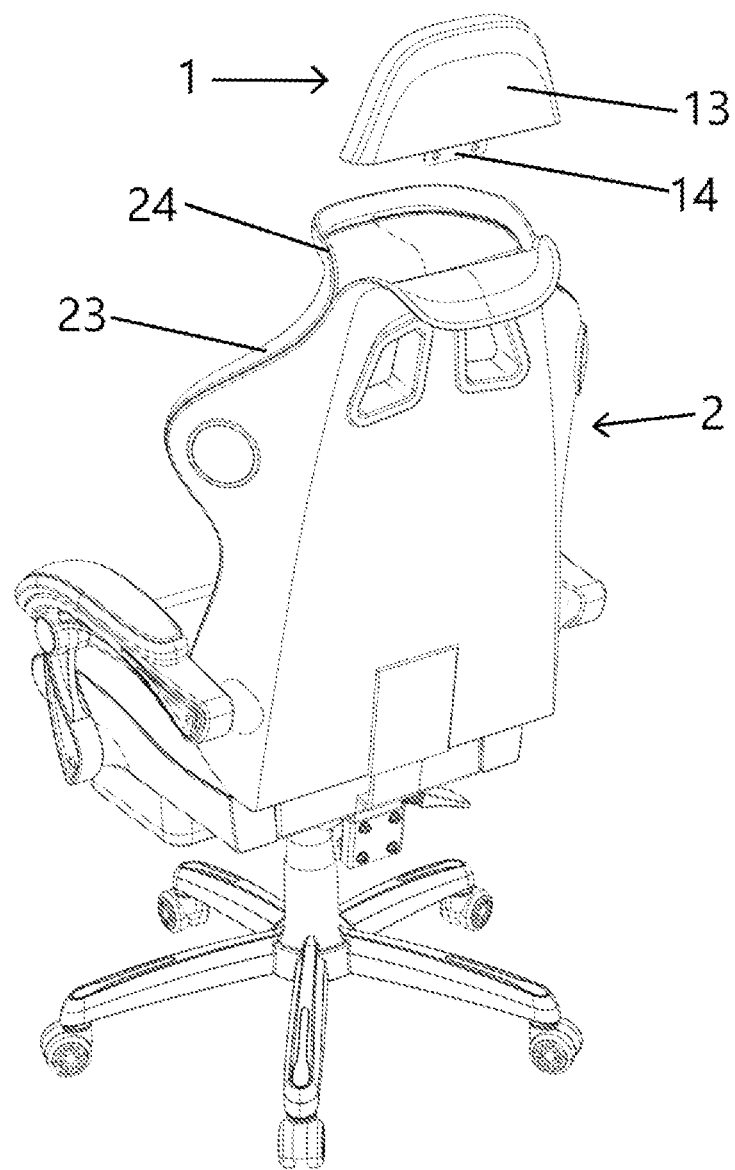
FIG. 2 is a schematic diagram showing the structures of a headrest and a chairback covering according to the present disclosure.
Figure 3:
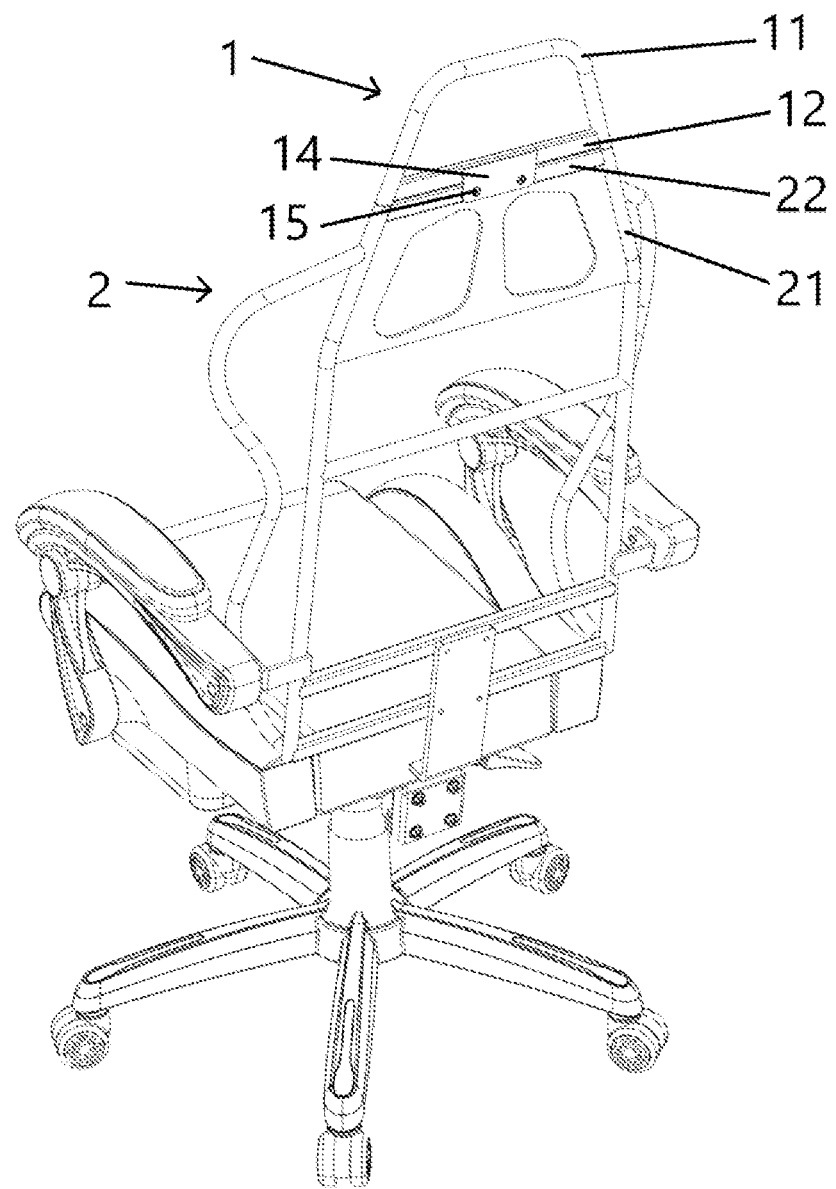
FIG. 3 is a schematic diagram showing the rear-side structure after the headrest and a chairback are completely installed according to the present disclosure.
Figure 4:
FIG. 4 is a schematic diagram showing the front-side structure after the headrest and the chairback are completely installed according to the present disclosure.
Figure 5:
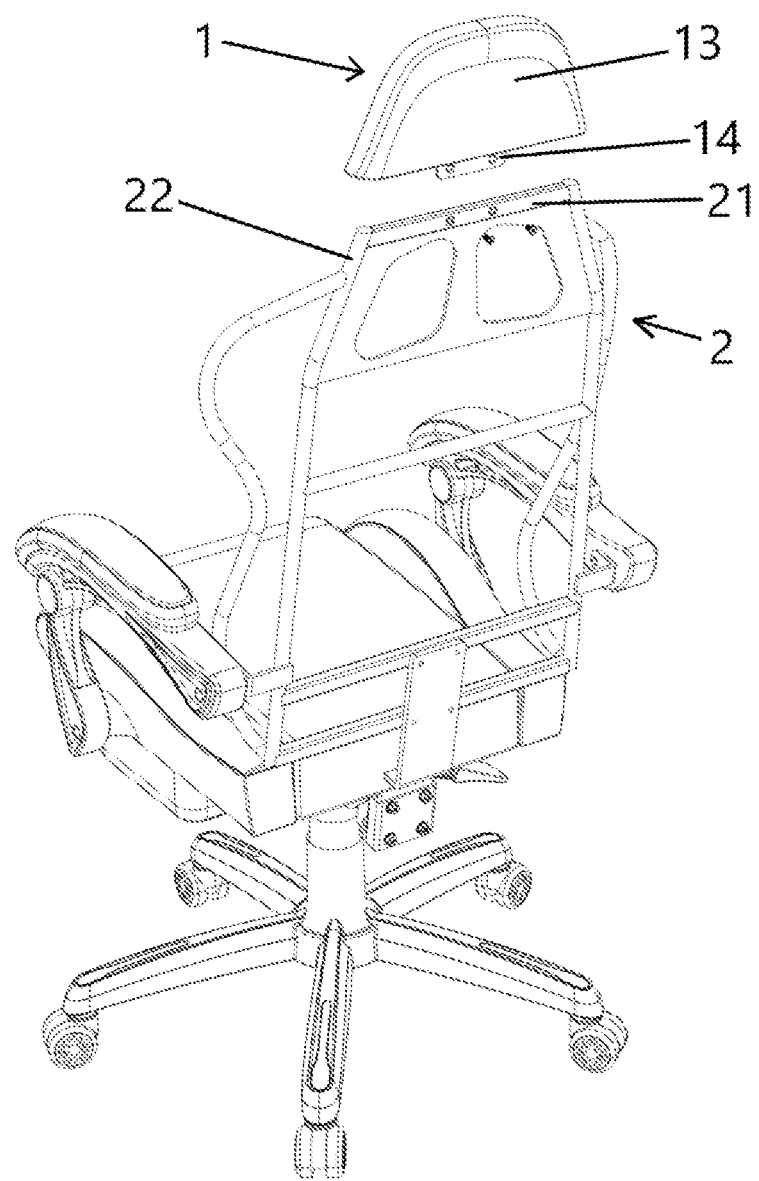
FIG. 5 is a schematic diagram showing the structure of the headrest installed with the headrest padding according to the present disclosure.
Figure 6:
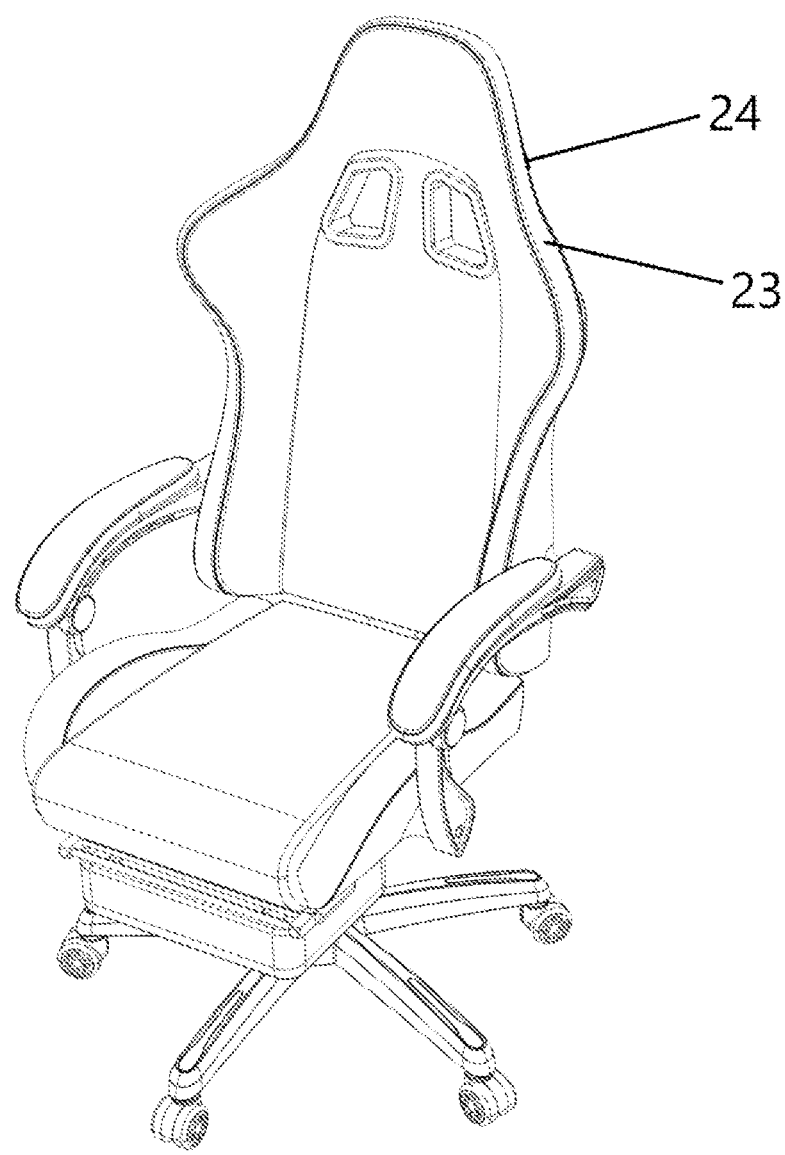
FIG. 6 is a schematic diagram showing the structure of the gaming chair after being completely installed according to the present disclosure.

As shown in FIGS. 1 and 2, a removable headrest for a gaming chair provided in the present disclosure includes the headrest 1 arranged on the top of the chairback 2 of the gaming chair. The headrest 1 includes the headrest frame 11, the headrest bottom support frame 12, and the headrest padding 13. The headrest frame 11 and the headrest bottom support frame 12 are tightly connected and arranged in the headrest padding 13. The chairback 2 includes the chairback frame 21, the chairback top support frame 22, and the chairback covering 23. The chairback frame 21 and the chairback top support frame 22 are tightly connected. The chairback frame 21, the chairback top support frame 22, and the headrest 1 are all arranged in the chairback covering 23. The installation plate 14 is arranged on the headrest bottom support frame 12, and the installation plate 14 extends to the outside of the headrest padding 13. The installation plate 14 and the chairback top support frame 22 are respectively provided with installation holes matched with each other, and the installation plate 14 and the chairback top support frame 22 are tightly connected through the installation holes. The headrest frame 11 and the chairback frame 21 are smoothly connected.

The headrest 1 and the chairback 2 are tightly connected through the installation plate 14 and are wrapped by the chairback covering 23, thereby making the appearance look like an integrated type. In fact, the headrest 1 can be removed according to the actual application, so that the height of the gaming chair is reduced to expand the scope of the application of the gaming chair.

As shown in FIGS. 3-6, the size of the headrest bottom support frame 12 and the size of the chairback top support frame 22 are matched with each other, and each of the headrest bottom support frame 12 and the chairback top support frame 22 includes a square tube. The headrest frame 11 includes a hollow round tube. The cross-sectional size of the headrest frame 11 and the cross-sectional size of the headrest bottom support frame 12 are matched with each other. The chairback frame 21 includes a hollow round tube. The cross-sectional size of the chairback frame 21 and the cross-sectional size of the chairback top support frame 22 are matched with each other. The headrest frame 11 and the headrest bottom support frame 12 are tightly connected by welding, and the bottom of the headrest frame 11 and the bottom of the headrest bottom support frame 12 are smoothly connected to be located on the same horizontal plane. The chairback frame 21 and the chairback top support frame 22 are tightly connected by welding, and the top of the chairback frame 21 and the top of the chairback top support frame 22 are smoothly connected to be located on the same horizontal plane. A side of the headrest bottom support frame 12 and a side of the chairback top support frame 22 are adjacent to each other and tightly abut against each other for cooperation. Therefore, the contact area between the headrest 1 and the chairback 2 is maximized to ensure the stability of the connection between the headrest 1 and the chairback 2.

The headrest frame 11 and the headrest bottom support frame 12 are tightly connected by welding, and the chairback frame 21 and the chairback top support frame 22 are tightly connected by welding. The bottoms of both the headrest frame 11 and the headrest bottom support frame 12, and the tops of both the chairback frame 21 and the chairback top support frame 22 tightly abut against each other for cooperation, and are tightly connected through the installation plate 14, such that the headrest 1 and the chairback 2 are smoothly connected. The headrest 1 and the chairback 2 are tightly connected by the simple structure of the installation plate 14, which has a high strength to ensure that the headrest 1 is prevented from being separated from the chairback 2 due to the stress during use. Moreover, the appearance looks like an integrated type due to the wrapping of the chairback covering 23. In fact, the headrest 1 can be removed according to the actual application, thus expanding the scope of the application of the gaming chair.

The installation plate 14 is arranged on the rear side of the headrest bottom support frame 12. The installation plate 14 and the headrest bottom support frame 12 are tightly connected by welding to ensure overall strength.

A rivet nut is arranged in the installation hole of the chairback top support frame 22, and the installation plate 14 and the installation hole are tightly connected by tightening the screw 15. Preferably, two installation holes are arranged, and the installation holes in the chairback top support frame 22 do not penetrate the chairback top support frame 22. The length of the screw 15 is matched with the depth of the installation hole in the chairback top support frame 22.

In general, the material of the headrest padding 13 is sponge or latex, which has good elasticity. A breathable mesh cloth is wrapped outside the headrest padding 13 to play a protective role when the headrest 1 is removed.

A chairback padding is similarly arranged in the chairback 2, and the material of the chairback padding is generally sponge or latex. The installation holes in the chairback top support frame 22 are not wrapped by the chairback padding to ensure the ease installation of the headrest 1 and the chairback 2. The chairback covering 23 is wrapped on the chairback padding. The chairback covering 23 can be made of leather, mesh, or a combination of the two as needed.

The top of the chairback covering 23 is provided with the zipper 24, and the zipper 24 is arranged on the rear side of the chairback 2 and along the contour of the chairback 2 to be better hidden at the joint of the chairback covering 23. The opening of the zipper 24 is matched with the size of the headrest 1 to facilitate the removal of the headrest 1. Similarly, the size of the zipper 24 is matched with the chairback 2 to facilitate the removal of the chairback covering 23 for cleaning.

Embodiment 2

A gaming chair according to the present disclosure employs the removable headrest for the gaming chair described in Embodiment 1, and further includes the chairback 2, an armrest, a cushion, and a rotational support frame.

Working Principle

The headrest 1 and the chairback 2 are tightly connected through the installation plate 14 and are wrapped by the chairback covering 23, thereby making the appearance look like an integrated type. In fact, the headrest 1 can be removed according to the actual application to expand the scope of the application of the gaming chair.

In the description of the present disclosure, it should be understood that location or position relationships indicated by the terms "up," "down," "front," "rear," "left," "right," "vertical," "horizontal," "top," "bottom," "inside," "outside" are based on the location or position relationships shown in the drawings, only to facilitate the description of the present disclosure and simplify the description, rather than to indicate or imply that the device or element referred to must have a particular orientation and be constructed and operated in a particular orientation, and therefore they should not be construed as a limitation of the present disclosure.

The specific embodiments of the present disclosure are described above. It should be understood that the present disclosure is not limited to the above specific embodiments, and those skilled in the art may make various changes or modifications within the scope of the claims, which does not affect the substance of the present disclosure. In the case of no conflict, the embodiments of the present disclosure as well as the features in embodiments may be arbitrarily combined.

What is claimed is:

1. A removable headrest for a gaming chair, comprising a headrest arranged on a top of a chairback of the gaming chair;
    wherein the headrest comprises a headrest frame, a headrest bottom support frame, and a headrest padding;
    the headrest frame and the headrest bottom support frame are tightly connected and arranged in the headrest padding;
    the chairback comprises a chairback frame, a chairback top support frame, and a chairback covering; the chairback frame and the chairback top support frame are tightly connected;
    the chairback frame, the chairback top support frame, and the headrest are arranged in the chairback covering;
    an installation plate is arranged on the headrest bottom support frame, and the installation plate extends to an outside of the headrest padding;
    the installation plate is provided with a first installation hole, and the chairback top support frame is provided with a second installation hole, wherein the first installation hole and the second installation hole are matched with each other, and the installation plate and the chairback top support frame are tightly connected through the first installation hole and the second installation hole;
    the headrest frame and the chairback frame are smoothly connected.

2. The removable headrest for the gaming chair according to claim 1, wherein the installation plate is arranged on a rear side of the headrest bottom support frame.

3. The removable headrest for the gaming chair according to claim 1, wherein a side of the headrest bottom support frame and a side of the chairback top support frame are adjacent to each other and tightly abut against each other for cooperation.

4. The removable headrest for the gaming chair according to claim 1, wherein a size of the headrest bottom support frame and a size of the chairback top support frame are matched with each other, and each of the headrest bottom support frame and the chairback top support frame comprises a square tube.

5. The removable headrest for the gaming chair according to claim 1, wherein the headrest frame comprises a hollow round tube; and
    a cross-sectional size of the headrest frame and a cross-sectional size of the headrest bottom support frame are matched with each other.

6. The removable headrest for the gaming chair according to claim 1, wherein a bottom of the headrest frame and a bottom of the headrest bottom support frame are smoothly connected; and
    a top of the chairback frame and a top of the chairback top support frame are smoothly connected.

7. The removable headrest for the gaming chair according to claim 1, wherein the installation plate and the chairback top support frame are tightly connected through a screw, and a rivet nut matched with the screw is arranged in the second installation hole of the chairback top support frame.

8. The removable headrest for the gaming chair according to claim 1, wherein a breathable mesh cloth is wrapped outside the headrest padding.

9. The removable headrest for the gaming chair according to claim 1, wherein a top of the chairback covering is provided with a zipper.

10. A gaming chair, employing the removable headrest for the gaming chair according to claim 1, and further comprising the chairback, an armrest, a cushion, and a rotational support frame.

11. The gaming chair according to claim 10, wherein the installation plate is arranged on a rear side of the headrest bottom support frame.

12. The gaming chair according to claim 10, wherein a side of the headrest bottom support frame and a side of the chairback top support frame are adjacent to each other and tightly abut against each other for cooperation.

13. The gaming chair according to claim 10, wherein a size of the headrest bottom support frame and a size of the chairback top support frame are matched with each other, and each of the headrest bottom support frame and the chairback top support frame comprises a square tube.

14. The gaming chair according to claim 10, wherein the headrest frame comprises a hollow round tube; and a cross-sectional size of the headrest frame and a cross-sectional size of the headrest bottom support frame are matched with each other.

15. The gaming chair according to claim 10, wherein a bottom of the headrest frame and a bottom of the headrest bottom support frame are smoothly connected; and a top of the chairback frame and a top of the chairback top support frame are smoothly connected.

16. The gaming chair according to claim 10, wherein the installation plate and the chairback top support frame are tightly connected through a screw, and a rivet nut matched with the screw is arranged in the second installation hole of the chairback top support frame.

17. The gaming chair according to claim 10, wherein a breathable mesh cloth is wrapped outside the headrest padding.

18. The gaming chair according to claim 10, wherein a top of the chairback covering is provided with a zipper.

* * * * *